United States Patent [19]

Snyder et al.

[11] Patent Number: 4,865,694

[45] Date of Patent: Sep. 12, 1989

[54] ELECTROCHEMICAL DECOMPOSITION OF COMPLEXES OF ZIRCONIUM OR HAFNIUM

[75] Inventors: Thomas S. Snyder, Oakmont; Richard A. Stoltz, Murrysville; David F. McLaughlin, Oakmont, all of Pa.

[73] Assignee: Westinghouse Electric Corp., Pittsburgh, Pa.

[21] Appl. No.: 242,571

[22] Filed: Sep. 12, 1988

[51] Int. Cl.⁴ .................. B01D 3/00; C01G 25/04; C01G 27/04; C22B 34/14

[52] U.S. Cl. .................................. 203/29; 203/50; 203/DIG. 16; 75/84.5; 204/64 T; 204/130; 423/73; 423/492

[58] Field of Search ............ 203/29, 39, 32, 50, 203/51, DIG. 16, DIG. 25; 423/73, 76, 492, 72, 78; 204/64 T, 130; 75/84.5

[56] References Cited

U.S. PATENT DOCUMENTS

| | | | |
|---|---|---|---|
| 1,582,860 | 4/1926 | van Arkel et al. | 423/73 |
| 2,214,211 | 9/1940 | Von Zeppelin | 75/84 |
| 2,602,725 | 7/1952 | Wilhelm et al. | 423/489 |
| 2,816,814 | 12/1957 | Plucknett | 203/71 |
| 2,852,446 | 9/1958 | Bromberg | 203/1 |
| 2,905,613 | 9/1959 | Tomonari | 204/216 |
| 2,920,027 | 1/1960 | Dean | 204/218 |
| 2,928,722 | 3/1960 | Scheller | 203/51 |
| 2,938,769 | 5/1960 | Overholser | 423/70 |
| 2,942,969 | 6/1960 | Doyle | 75/84.5 |
| 3,006,719 | 10/1961 | Miller | 423/70 |
| 3,600,284 | 8/1971 | Martinez | 204/39 |
| 3,671,186 | 6/1972 | Ishizuka | 423/73 |
| 3,764,493 | 10/1973 | Nicks | 204/64 R |
| 3,966,458 | 6/1976 | Spink | 75/84.5 |
| 4,021,531 | 4/1977 | Besson | 423/492 |
| 4,127,409 | 11/1978 | Megy | 75/84.5 |
| 4,285,724 | 8/1981 | Becker | 75/84.4 |
| 4,443,306 | 4/1984 | Armand et al. | 204/64 T |
| 4,511,399 | 4/1985 | Kwon | 75/84.5 |
| 4,556,420 | 12/1985 | Evans | 75/84.5 |
| 4,613,366 | 9/1986 | Kwon | 75/84.5 |
| 4,637,831 | 1/1987 | Stoltz | 75/84.5 |
| 4,668,287 | 5/1987 | Kwon | 423/76 |
| 4,670,121 | 6/1987 | Ginatta | 204/225 |
| 4,737,244 | 4/1988 | McLaughlin | 203/51 |
| 4,749,448 | 6/1988 | Stoltz | 203/51 |

FOREIGN PATENT DOCUMENTS 2543162 9/1984 France .

OTHER PUBLICATIONS

Vinarov: Modern Methods of Separating Zirconium and Hafnium; Russian Chemical Reviews, vol. 36, No. 7, Jul. 1967, pp. 522–536.
Plucknett–AEC Report ISC-51-1949.
Mackenzie & Murphy; J. Chem. Phys. 33366, 1960.
Williams; U.S. AEC Report NY00-1009, Aug. 1950.
Martinez et al.; Metall. Trans., 3,571, 1972.
Mellors et al.; J. Electrochem. Soc., 114,60, 1966.

*Primary Examiner*—Wilbur Bascomb
*Attorney, Agent, or Firm*—R. A. Stoltz

[57] ABSTRACT

This is an improved method for separating hafnium from zirconium of the type where a complex of zirconium and hafnium chlorides and phosphorus oxychloride is prepared from zirconium-hafnium chloride and the complex is introduced into a distillation column, with the improvement comprising: electrochemical breaking of the zirconium of hafnium chloride complex taken from said distillation column to separate product from the complex. The electrochemical breaking of the complex, possibly by reducing zirconium or hafnium, is done in a molten salt bath. Preferably, the molten salt in said molten salt bath consists principally of a mixture of alkali metal and alkaline earth metal chlorides and zirconium or hafnium chloride. The product can be either chloride, metal, or mixed metal and subchloride for further processing.

7 Claims, 1 Drawing Sheet

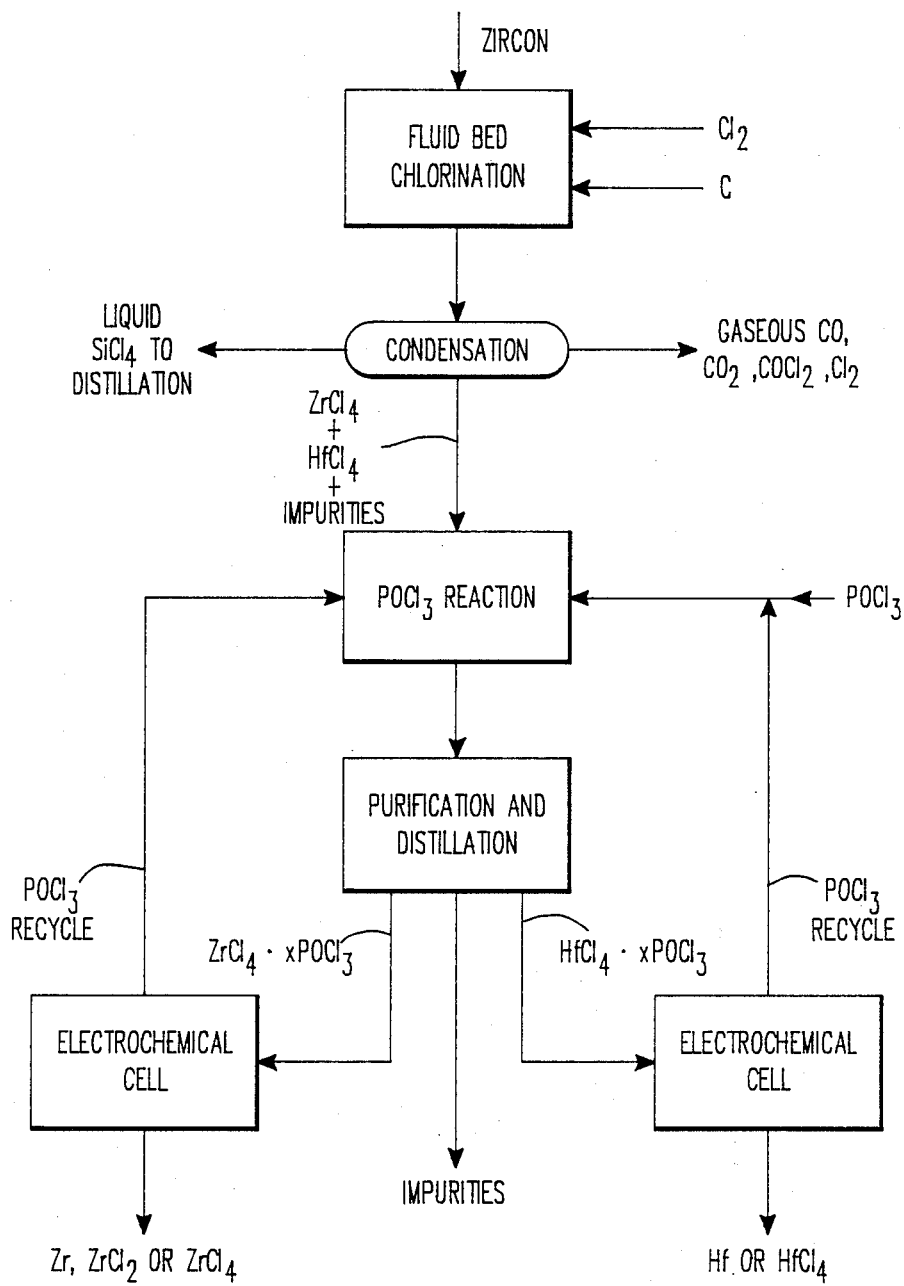

ELECTROCHEMICAL DECOMPOSITION OF COMPLEXES OF ZIRCONIUM OR HAFNIUM

CROSS-REFERENCE TO CO-PENDING APPLICATIONS

A process for zirconium-hafnium separation is described in related application Serial No. 242,574, filed Sept. 12, 1988 and assigned to the same assignee. That related application utilizes a complex of zirconium-hafnium chlorides and phosphorus oxychloride prepared from zirconium-hafnium chlorides with the complex of zirconium-hafnium chlorides and phosphorus oxychloride being introduced into a distillation column and a hafnium chloride enriched stream is taken from the top of the column and a zirconium enriched chloride stream is taken from the bottom of the column, and in particular with prepurifing said zirconium-hafnium chlorides prior to introduction of said complex into a distillation column to substantially eliminate iron chloride from the zirconium-hafnium chlorides, whereby buildup of iron chloride in the distillation column is substantially eliminated and the column can be operated in a continuous, stable manner.

An improved process for prepurification of zirconium-hafnium chlorides prior to preparation of a complex of zirconium-hafnium chlorides and phosphorus oxychloride for use in a distillation column for zirconium-hafnium separation is described in related application Serial No. 242,572, filed Sept. 12, 1988 and assigned to the same assignee. That related application utilizes prepurification of zirconium-hafnium chlorides prior to complexing with phosphorus oxychloride by passing the zirconium-hafnium chloride through an essentially oxygen-free molten salt purification-sublimation system, and at least periodically removing iron chloride from the molten salt purification sublimation system by electrochemically plating iron out of molten salt purification-sublimation system. The molten salt in the molten salt purification-sublimation system consisting essentially of a mixture of alkali metal and alkaline earth metal chlorides, zirconium-hafnium chlorides and impurities.

A process for zirconium-hafnium separation is described in related application Serial No. 242,570, filed Sept. 12, 1978 and assigned to the same assignee. That related application utilizes an extractive distillation column with a mixture of zirconium and hafnium tetrachlorides introduced into a distillation column and a molten salt solvent circulated through the column to provide a liquid phase, and with the molten salt solvent consisting principally of lithium chloride and at least one of sodium, magnesium and calcium chlorides. Stripping of the zirconium chloride taken from the bottom of distillation column is provided by electrochemically reducing zirconium from the molten salt solvent. A pressurized reflux condenser is used on the top of the column to add hafnium chloride to the previously stripped molten salt solvent which is being circulated back to the top of the column.

A process for zirconium-hafnium reduction (and possibly separation) is described in related application Serial No. 242,570, filed Sept. 12, 1988 and assigned to the same assignee. That related application utilizes reduction to metal of the zirconium and/or hafnium chloride taken from the distillation column by electrochemically reducing an alkaline earth metal in a molten salt bath with the molten salt in the molten salt bath consisting principally of a mixture of at least one alkali metal chloride and at least one alkaline earth metal chloride and zirconium or hafnium chloride, with the reduced alkaline earth metal reacting with the zirconium or hafnium chloride to produce zirconium or hafnium metal product and alkaline earth metal chloride.

A process for separating nickel from zirconium for recycling nickel-containing zirconium alloy is described in related application Serial No. 242,573, filed Sept. 12, 1988 and assigned to the same assignee. That related application utilizes placing nickel-containing zirconium in a molten salt bath with the molten salt in the molten salt bath consisting principally of a mixture of at least two alkali metal fluorides to produce a molten salt bath containing dissolved zirconium and dissolved nickel, electrochemically plating the nickel from the molten salt bath at a voltage sufficient to plate nickel but less than the voltage to plate zirconium to provide an essentially nickel-free molten salt bath; and electrochemically reducing the zirconium from the essentially nickel-free molten salt bath to provide an essentially nickel-free zirconium.

A process for removing phosphorus oxychloride from a complex of zirconium or hafnium chloride and phosphorus oxychloride is described in related application Serial No. 242,563, filed Sept. 12, 1988 and assigned to the same assignee. That related application utilizes a lithium-potassium chloride molten salt absorber vessel with a condenser which has the complex of zirconium or hafnium chloride and phosphorus oxychloride as the condensing fluid to scrub zirconium or hafnium chloride from the phosphorus oxychloride vapor. The process uses at least one separate vessel to strip the zirconium or hafnium chloride from the lithium-potassium chloride molten salt.

The preceding related applications are all assigned to the same assignee and are all hereby incorporated by reference.

BACKGROUND OF THE INVENTION

This invention relates to separation (and possibly also reduction) of zirconium and hafnium chloride and in particular relates to breaking zirconium or hafnium from a phosphorous oxychloride complex after distillation has separated the hafnium from the zirconium.

Naturally occurring zirconium ores generally contain from 1 to 3 percent hafnium oxide relative to zirconium oxide. In order that the zirconium metal be acceptable as a nuclear reactor material, the hafnium content must first be reduced to low levels, due to the high neutron absorption cross section of hafnium. This separation process is difficult due to the extreme chemical similarity of the two elements. A number of techniques have been explored to accomplish this separation, with the technique currently in use in the United States involving liquid-liquid extraction of aqueous zirconyl chloride thiocyanate complex solution using methyl isobutyl ketone, generally as described in U.S. Pat. No. 2,938,679, issued to Overholser on May 31, 1960, with the removal of iron impurities prior to solvent extraction generally as described in U.S. Pat. No. 3,006,719, issued to Miller on Oct. 31, 1961.

Several other processes have been suggested for separation of the zirconium-hafnium tetrachloride $(Zr,Hf)Cl_4$ generated from the ore by carbochlorination. The use of a nonaqueous separation offers significant economic incentive over those processes requiring aqueous zirconium solutions. Direct distillation of the tetrachlorides provides one possible route, relying on the difference in boiling points between zirconium tetrachloride and hafnium tetrachloride. Unfortunately, direct distillation cannot be accomplished at near atmospheric pressure, since neither tetrachloride exhibits a liquid phase except at very high pressure. U.S. Pat. No. 2,852,446, issued to Bromberg on Sept. 16, 1958, describes a high pressure distillation process where the pressure, rather than a solvent, provides for a liquid phase.

U.S. Pat. No. 2,816,814 issued to Plucknett on Dec. 17, 1957, describes extractive distillation for separation of the tetrachlorides using a stannous chloride solvent. U.S. Pat. No. 2,928,722 to Scheller, issued March 15, 1960, describes the batch fractional distillation of niobium and tantalum chlorides to separate these chlorides from each other and from other chloride impurities, and uses a "flux" to provide the molten salt phase, utilizing either zirconium tetrachloride-phosphorus oxychloride complex or an alkali metal chloride and aluminum (or iron, or zirconium) chloride mixture as the flux. U.S. Pat. No. 3,966,458 issued to Spink on June 29, 1976 provides a sodium-potassium chloride solvent for use in the extractive distillation of zirconium and hafnium tetrachlorides. U.S. Pat. No. 3,671,186 issued to Ishizuka on June 20, 1972 utilizes a series of dissolution and evaporation stages with a solvent such as sodium chloride. U.S. Pat. No.4,021,32 issued to Besson on April 3, 1977, utilizes extractive distillation with an alkali metal chloride and aluminum (or iron) chloride mixture as the solvent. Extractive distillation of zirconium-hafnium tetrachloride with a pure zinc chloride solvent has been attempted (Plucknett et al., U.S. AEC Report ISC-51, 1949), but was unsuccessful due to the formation of a highly viscous two-phase system. The anomalously high viscosity of zinc chloride is described by MacKenzie and Murphy (J. Chem. Phys., 33, 366, 1960). U.S. Pat. No. 4,737,244 to McLaughlin et al. describes an extractive distillation method for separating hafnium from zirconium of the type wherein a mixture of zirconium and hafnium tetrachlorides is introduced into a distillation column, with a recirculating molten salt solvent in the column to provide a liquid phase, and the improvement comprising having a molten salt solvent composition of at least 30 mole percent zinc chloride and at least 10 mole percent of lead chloride.

A process for zirconium-hafnium separation is described in U.S. Pat. No. 4,749,448 issued June 7, 1988 to Stoltz et al. This patent provides for zirconium-hafnium separation by extractive distillation with the molten solvent containing zinc chloride; it utilizes at least 80 mole percent zinc chloride, with the remainder including a viscosity reducer of magnesium chloride, calcium chloride, or mixtures thereof.

Of all of the molten salt distillation processes, only the above-mentioned Besson process with a potassium chloride-aluminum chloride solvent has been brought to commercial development. This process is currently in use in France and provides product zirconium tetrachloride, relatively depleted of hafnium tetrachloride in the liquid bottoms stream, and a hafnium tetrachloride enriched vapor stream taken from the top of the column. A relatively high reflux is provided by a condenser at the top of the column and a reboiler at the bottom of the column. Because of the stability of the double salts formed with the alkali metal chloride in the solvent, it is very difficult to completely separate the product zirconium tetrachloride from the solvent, and relatively high (e.g. 500° C.) temperatures are required. Aluminum chloride in excess of 1:1 molar to alkali metal chloride is required and there is considerable carry-over of aluminum chloride into the zirconium tetrachloride leaving the stripper. French Patent 2,543,162 (9-28-84) to Brun and Guerin describes a post-stripping process for removing aluminum chloride. In addition, it should be noted that aluminum chloride is an especially hygroscopic and corrosive molten salt, and, at higher temperatures, is very difficult to handle.

Another separation process involves fractionation of the chemical complex formed by the reaction of $(Zr,Hf)Cl_4$ with phosphorus oxychloride ($POCl_3$) This technique was patented in 1926 by van Arkel and de Boer (U.S. Pat. No. 1,582,860), and was based on the approximately 5° C. boiling point difference between the hafnium and zirconium complex pseudoazeotropes, having the nominal compositions $3(Zr,Hf)Cl_4:2POCl_3$. This composition may be produced by direct reaction between liquid phosphorus oxychloride and the crude zirconium-hafnium tetrachloride obtained from opening of the ore.

Extensive work (e.g. Williams et al., US AEC Report NYOO-1009, August 1950) was done on the zirconium-hafnium tetrachloride complex with phosphorus oxychloride in the early 1950s, utilizing generally the molten salt distillation process of the aforementioned U.S. Pat. No. 1,582,860 of van Arkel and de Boer. While this extensive effort did provide some separation, the process was very difficult to control, and both the reboiler liquid volatility and the Hf/Zr separation factor degraded significantly with time. Despite the extensive investment in time and money, this approach was abandoned and the U.S. effort was concentrated on the liquid-liquid extraction described in the above-mentioned U.S. Pat. No. 2,938,769 of Overholser. The liquid-liquid extraction remains the only commercially utilized process for zirconium-hafnium separation in the United States today.

Chlorination processing is the commercially preferred process for nuclear grade zirconium and hafnium production. Although traditional process art employs hydrometallurgical operations for purification and separation, significant process operating and cost advantages could be realized by distillation of the metal chloride salts or their $POCl_3$ complexes. However, in distilling $POCl_3$ complexes, a quantitative operation to crack the complex and to recover the metal tetrachloride (prior to reduction) is required.

Normally, separation of hafnium from zirconium (as chlorides) is followed by reduction of the chlorides to metal. Modifications to the reduction process have been suggested in many U.S. Patents, including U.S. Pat. Nos.4,511,399; 4,556,420; 4,613,366; 4,637,831; and 4,668,287, assigned to the same assignee. A high temperature process using zirconium tetrachloride as a part of a molten salt bath and reducing zirconium from the chloride to the metal (molten salt systems mentioned were potassium-zirconium chlorides and sodium-zirconium chlorides) is suggested in U.S. Pat. No. 2,214,211 to Von Zeppelin et al. A relatively high temperature process using zirconium tetrachloride as a part of a molten salt bath and introducing magnesium to reduce zirconium from the chloride to the metal (with external electrolytic reduction of magnesium from the chloride to the metal, to recycle magnesium) is suggested in U.S. Pat. No. 4,285,724 to Becker et al. Another high temperature process using zirconium tetrachloride as a part of a molten salt bath and which introduces sodium-magnesium alloy to reduce zirconium from the chloride to the metal (with a molten salt of magnesium chloride and sodium chloride is suggested in U.S. Pat. No. 2,942,969 to Doyle. Using zirconium tetrachloride as a part of a molten salt bath and preferably introducing aluminum (but possibly magnesium) to reduce zirconium from the chloride to the metal, generally with the aluminum being introduced dissolved in a molten zinc is taught by Megy in U.S. Pat. No. 4,127,409. Electrolytic-refining (metal in, metal out purification, rather than reduction from the chloride) processes are suggested in U.S. Pat. Nos. 2,905,613 and 2,920,027.

Molten (fused) chloride salt electrochemical (electrolytic) processes for deposition of metal on one electrode) are known in the art. U.S. Pat. No. 3,764,493 to Nicks et al., and U.S. Pat. No.4,670,121 to Ginatta et al. are examples of such processes. Direct electrolysis of zirconium has been reported in all-chloride molten salt systems, in mixed chloride-fluoride systems, and in all fluoride systems (Martinez et al., Metall. Trans., U.S. Pat. No. 3, 571, 1972; Mellors et al., J. Electrochem. Soc., 114, 60, 1966). All-metallic deposits were obtained from fluoride-containing baths (e.g. at 800° C. using sodium fluorozirconate), but the efforts to plate out of all-chloride baths always produced a significant amount of subchlorides.

SUMMARY OF THE INVENTION

This is an improvement to the method of the type for separating hafnium from zirconium where a complex of zirconium and hafnium chlorides and phosphorus oxychloride is prepared from zirconium-hafnium chloride and the complex is introduced into a distillation column, which distillation column has a reboiler connected at the bottom and a reflux condenser connected at the top, and wherein a hafnium chloride enriched stream is taken from the top of the column and a zirconium enriched chloride stream is taken from the bottom of the column, with the improvement comprising: electrochemically breaking the complex taken from the zirconium or hafnium chloride taken from the distillation column (preferably by reducing zirconium or hafnium) in a chloride or fluoride and chloride molten salt bath. Preferably, the molten salt in said molten salt bath consists principally of a mixture of alkali metal and alkaline earth metal chlorides and/or fluorides and zirconium or hafnium chloride.

Preferably (for producing hafnium metal; or a mixture of zirconium metal and zirconium dichloride, with the zirconium dichloride being further reduced to metal in later processing) the molten salt in said molten salt bath consists essentially of a mixture of lithium chloride, potassium chloride and zirconium or hafnium chloride (especially with the lithium chloride and potassium chloride proportions being about 59 mole percent lithium chloride and about 41 mole percent potassium chloride). Preferably, the bath is operated at 360°–500° C. (e.g., at about 420° C.).

BRIEF DESCRIPTION OF THE DRAWING

The invention can be better understood by reference to the drawing, in which:

The sole FIGURE is a process diagram showing an embodiment of the invention together with typical prior processing steps.

DESCRIPTION OF THE PREFERRED EMBODIMENTS

The production of nuclear grade zirconium and hafnium generally starts by cracking zircon sand ($ZrO_2$ +$SiO_2$ +$HfO_2$) The zirconium and hafnium compounds resulting from the cracking must be separated and purified.

The cracking process which is generally used commercially is chlorination. Although a variety of separation processes are feasible for the chlorination products, fused salt distillation of $ZrCl_4$ and $HfCl_4$ complexed with $POCl_3$ is particularly attractive as a separation method as it maintains Zr and Hf as tetrachlorides. These metal chlorides could be reduced directly to metal without a second chlorination step if a process were available which breaks the complex with $POCl_3$. Since the value of x in the $MCl_4 \cdot XPOCl_3$ azeotrope may take on a range of values, thermal or chemical decomposition processes may not effectively decompose all the azeotropic forms quantitatively. Therefore, it is the objective of the present invention to provide an electrochemical process which in a single step: breaks the $POCl_3$-tetrachloride complex; and preferably reduces the $ZrCl_4$ or $HfCl_4$ directly to metal.

The FIGURE is the process block diagram. Zircon sand is typically chlorinated by reaction with carbon and chlorine at 1000°–1300° C. The reaction products are separated rated by condensation into three fractions: (Hf +Zr)$Cl_4$ plus impurities; $SiCl_4$ plus impurities; and gaseous waste products (generally, CO, $CO_2$, $COCl_2$ and $Cl_2$). After complexing with $POCl_3$, zirconium and hafnium are separated by distillation of the complex. The aforementioned copending application Serial No. 242,572 teaches that the (Zr/Hf)$Cl_4$ stream may also be electrolytically purified prior to complexing. Following distillative separation, the $POCl_3$-tetrachloride complexes must be broken to recover hafnium and zirconium. Based on the electromotive series in Table 1 (excerpts from the Carson table from Planbook, J. Chem. Eng Data, 12, 77, 1967), Bard, A. J., Encyclopedia of Electrochemistry of the Elements, Marcel Dekkar, 1976), this complex may be broken by molten salt electrolysis. Candidate salts for the electrolysis include: 50 mole % LiCl - 41 mole % KCl - Eutectic - 360° C. mp; 50 mole % $AlC_3$ - 50 mole % NaCl - Eutectic - 175° C. mp; and $AlCl_3$ - NaCl - KCl Eutectic -150° C. mp. The electrolysis cell may be operated under pressure or reflux. The cell operating temperature varies as a function of electrolyte as noted above.

TABLE I

| | Summary of the Electromotive Force Series - 450° C. | | | | |
|---|---|---|---|---|---|
| Couple | $E_M°$ (Pt), V | $E_M°$ (Pt), V | $E_X°$ (Pt), V | $E_M°$ (Ag), V | Precision, V |
| Li(I)/Li(0) | −3.304 | −3.320 | −3.410 | −2.593 | 0.002 |
| Na(I)/Na(0) | −3.25 | −3.23 | −3.14 | −2.50 | 0.008 |
| $H_2$(g), Fe/H− | −2.80 | −2.98 | −3.11 | −2.25 | 0.06 |
| Ce(III)/Ce(0) | −2.905 | −2.910 | −2.940 | −2.183 | 0.03 |
| La(III)/La(0) | −2.848 | −2.853 | −2.883 | −2.126 | 0.007* |

TABLE I-continued

Summary of the Electromotive Force Series - 450° C.

| Couple | $E_M°$ (Pt), V | $E_M°$ (Pt), V | $E_X°$ (Pt), V | $E_M°$ (Ag), V | Precision, V |
|---|---|---|---|---|---|
| Y(III)/Y(0) | −2.831 | −2.836 | −2.866 | −2.109 | 0.008 |
| Nd(III)/Nd(0) | −2.819 | −2.824 | −2.854 | −2.097 | 0.005* |
| Gd(III)/Gd(0) | −2.788 | −2.793 | −2.823 | −2.066 | 0.005* |
| Mg(II)/Mg(0) | −2.580 | −2.580 | −2.580 | −1.853 | 0.002 |
| Sc(III)/Sc(0) | −2.553 | −2.558 | −2.588 | −1.831 | 0.015 |
| Th(IV)/Th(O) | −2.350 | −2.358 | −2.403 | −1.531 | 0.005*, *** |
| U(III)/U(0) | −2.218 | −2.223 | −2.253 | −1.496 | 0.005** |
| Be(II)/Be(0) | −2.039 | −2.039 | −2.039 | −1.312 | 0.013 |
| Np(III)/Np(0) | −2.033 | −2.038 | −2.068 | −1.311 | 0.005*** |
| U(IV)/U(0) | −1.950 | −1.957 | −2.002 | −1.230 | 0.011** |
| Zr(IV)/Zr(II) | −1.864 | −1.880 | −1.970 | −1.153 | −.01** |
| Mn(II)/Mn(0) | −1.849 | −1.849 | −1.849 | −1.122 | 0.008 |
| Hf(IV)/Hf(0) | −1.827 | −1.835 | −1.880 | −1.108 | 0.01 |
| Cd(II)/Cd(0) | −1.316 | −1.316 | −1.316 | −0.589 | 0.002 |
| V(III)/V(0) | −1.217 | −1.277 | −1.307 | −0.550 | 0.01** |
| In(I)/In(0) | −1.210 | −1.194 | −1.104 | −0.467 | 0.012 |
| Pu(IV)/Pu(0) | −1.199 | −1.208 | −1.650 | −0.634 | 0.006** |
| Np(IV)/Np(III) | −1.170 | −1.186 | −1.276 | −0.459 | 0.002*** |
| Fe(II)/Fe(0) | −1.172 | −1.172 | −1.172 | −0.445 | 0.005 |
| Se(1),C/Se$^2$ | −1.141 | −1.172 | −1.252 | −0.445 | 0.002* |
| Nb(III?)/Nb(0) | −1.15 | −1.16 | −1.19 | −0.43 | 0.1*** |
| U(IV)/U(III) | −1.144 | −1.160 | −1.250 | −0.433 | 0.01 |
| Ga(III)/Ga(0) | −1.136 | −1.141 | −1.171 | −0.414 | 0.008 |
| Cr(III)/Cr(0) | −1.125 | −1.130 | −1.160 | −0.403 | 0.01** |
| Pb(II)/Pb(0) | −1.101 | −1.101 | −1.101 | −0.374 | 0.002 |
| Sn(II)/Sn(0) | −1.082 | −1.082 | −1.082 | −0.355 | 0.002 |
| S(1),C/S$^{2-}$ | −1.008 | −1.039 | −1.219 | −0.312 | 0.002* |
| In(III)/In(0) | −1.033 | −1.038 | −1.068 | −0.311 | 0.009** |
| Co(II)/Co(0) | −0.991 | −0.991 | −0.991 | −0.264 | 0.003 |
| Ta(IV)/Ta(0) | −0.957 | −0.965 | −1.010 | −0.238 | 0.01*** |
| In(III)/In(I) | −0.944 | −0.960 | −1.050 | −0.233 | 0.005 |
| Cu(I)/Cu(0) | −0.957 | −0.941 | −0.851 | −0.214 | 0.004 |
| Ni(II)/Ni(0) | −0.795 | −0.795 | −0.795 | −0.068 | 0.002 |
| Ge(II)/Ge(0) | −0.792 | −0.792 | −0.792 | −0.065 | 0.008 |
| V(III)/V(II) | −0.748 | −0.764 | −0.854 | −0.037 | 0.002 |
| Fe(III)/Fe(0) | −0.753 | −0.758 | −0.788 | −0.031 | 0.006** |
| Ag(I)/Ag(0) | −0.743 | −0.727 | −0.637 | 0.000 | 0.002 |
| Ge(IV)/Ge(0) | −0.728 | −0.736 | −0.781 | −0.009 | 0.008** |
| Sn(IV)/Sn(0) | −0.694 | −0.702 | −0.747 | +0.025 | 0.003** |
| HCl(g)/H$_2$(g), Pt | −0.694 | −0.710 | −0.800 | +0.017 | 0.005 |
| Ge(IV)/Ge(II) | −0.665 | −0.681 | −0.771 | +0.046 | −0.002 |
| Sb(III)/Sb(0) | −0.635 | −0.640 | −0.670 | +0.087 | 0.002 |
| Bi(III)/Bi(0) | −0.635 | −0.640 | −0.670 | +0.087 | 0.01 |
| Hg(II)/Hg(0) | −0.622 | −0.622 | −0.622 | +0.105 | |
| Mo(III)/Mo(0) | −0.603 | −0.608 | −0.638 | +0.119 | 0.002* |
| W(II)/W(0) | −0.585 | −0.585 | −0.585 | +0.142 | 0.015 |
| Eu(III)/Eu(II) | −0.538 | −0.554 | −0.644 | +0.173 | 0.007 |
| Cr(III)/Cr(II) | −0.525 | −0.541 | −0.631 | +0.186 | 0.01 |
| As(III)/As(0) | −0.460 | −0.465 | −0.495 | +0.262 | 0.017 |
| Cu(II)/Cu(0) | −0.448 | −0.448 | −0.448 | +0.279 | 0.003** |
| Tl(III)/Tl(0) | −0.385 | −0.390 | −0.420 | +0.377 | 0.003** |
| Re(IV)/Re(0) | −0.325 | −0.333 | −0.389 | +0.394 | 0.005 |
| Sn(IV)/Sn(II) | −0.310 | −0.326 | −0.416 | +0.416 | 0.003 |
| UO$_2{}^{2+}$/UO$_2$ | −0.285 | −0.285 | −0.285 | +0.442 | 0.005 |
| I$_2$(g)/C/I$^-$ | −0.207 | −0.254 | −0.525 | +0.473 | 0.008 |
| Pd(II)/Pd(0) | −0.214 | −0.214 | −0.214 | +0.513 | 0.002 |
| Rh(III)/Rh(0) | −0.196 | −0.201 | −0.231 | +0.526 | 0.004 |
| Ru(III)/Ru(0) | −0.107 | −0.112 | −0.142 | +0.615 | 0.007 |
| Te(II)/Te(0) | −0.10 | −0.10 | −0.10 | +0.63 | 0.03 |
| Ir(III)/Ir(0) | −0.057 | −0.062 | −0.092 | +0.665 | 0.002 |
| Pt(II)/Pt(0) | 0.000 | 0.000 | 0.000 | +0.727 | 0.002 |
| Cu(II)/Cu(I) | +0.061 | +0.045 | −0.045 | +0.772 | 0.002 |
| Fe(III)/Fe(II) | +0.086 | +0.070 | −0.020 | +0.797 | 0.003 |
| NpO$_2{}^+$/NpO | +0.072 | +0.088 | +0.198 | +0.815 | 0.002* |
| NpO$_2{}^{2+}$/NpO$_2{}^+$ | +0.102 | +0.086 | −0.004 | +0.723 | 0.020* |
| Pt(IV)/Pt(II) | +0.142 | +0.126 | +0.036 | +0.763 | 0.010 |
| Tl(III)/Tl(I) | +0.155 | +0.139 | +0.049 | +0.866 | 0.002 |
| Br$_2$(g),C/Br$^-$ | +0.177 | +0.130 | −0.141 | +0.857 | 0.002 |
| Au(I)/Au(0) | +0.205 | +0.221 | +0.311 | +0.948 | 0.008 |
| Pu(IV)/Pu(III) | +0.298 | +0.282 | +0.192 | +1.025 | 0.006 |
| Cl$_2$(g),C/Cl$^-$ | +0.322 | +0.306 | +0.216 | +1.033 | 0.002 |

*Extrapolated
**Calculated
***Precision estimated by writer

As can be seen from the reduction potential series in Table 1, both zirconium and hafnium metal may be won from the fused salt solution (although the zirconium metal will normally also include significant amounts of zirconium dichloride) directly by a cell operation at −1.864 to −1.826 volts reduction potential if the solvent salt includes only alkali metal and alkaline earth metal chlorides. This combines the breaking of the complex with the reduction of the tetrachloride (with zirconium being reduced at least to the dichloride) into a single process step. Alternately, operating the cell at lesser voltages may facilitate breaking the complex only, recovering a ZrCl4 or HfCl4 product for later reduction.

Thus, the present invention provides molten salt electrolysis to break the azeotropic composition, and also possibly to combine chemical decomplexing with (at least partial) reduction in a single stage. Molten salt electrolytes include but are not limited to: LiCl/KCl; AlCl3/NaCl; and AlCl13/*NaCl/KCl*.

This invention is not to be construed as limited to the particular examples described herein, as this is to be regarded as illustrative, rather than restrictive. The invention is intended to cover all processes which do not depart from the spirit or the scope of the invention.

What is claimed is:

1. In a method for separating hafnium from zirconium where a complex of zirconium and hafnium chlorides and phosphorus oxychloride is prepared from zirconium-hafnium chloride and the complex is subjected to a distillation to produce a hafnium chloride enriched stream of complex and a zirconium enriched chloride stream of complex, the improvement comprising:

electrochemical breaking said zirconium or hafnium chloride complex from said distillation in a chloride or fluoride and chloride molten salt bath to produce the metal or a chloride of zirconium or hafnium.

2. The method of claim 1, wherein the molten salt in said molten salt bath consists principally of a mixture of salts selected from the group consisting of alkali metal and alkaline earth metal chlorides and/or fluorides and zirconium or hafnium choloride.

3. The method of claim 1, wherein the molten salt in said molten salt bath consists essentially of a mixture of lithium chloride, potassium chloride and zirconium or hafnium chloride.

4. The method of claim 2, wherein said lithium chloride and potassium chloride are present in near-eutetic proportions.

5. The method of claim 3, wherein said lithium chloride and potassium chloride proportions are about 59 mole percent lithium chloride and about 41 mole percent potassium chloride.

6. The method of claim 2, wherein said bath is operated at 360°–500° C.

7. The method of claim 1, wherein said electrochemical breaking of said complex is by reducing the zirconium or hafnium of said complex.

* * * * *